United States Patent [19]
Brorson et al.

[11] Patent Number: 5,930,016
[45] Date of Patent: Jul. 27, 1999

[54] UPGRADABLE MODULAR WAVELENGTH DIVISION MULTIPLEXER

[75] Inventors: Stuart Douglas Brorson, White Plains; Paul Eliot Green, Jr., Mount Kisco, both of N.Y.; Karen Liu, Montclair, N.J.; Weyl-kuo Wang, Stamford, Conn.

[73] Assignee: Tellabs Operations, Inc., Lisle, Ill.

[21] Appl. No.: 08/728,871

[22] Filed: Oct. 10, 1996

[51] Int. Cl.⁶ .................................................. H04J 14/02
[52] U.S. Cl. ........................ 359/127; 359/133; 359/138; 359/173
[58] Field of Search .................................. 359/127, 128, 359/133, 138, 161, 163, 173

[56] References Cited

U.S. PATENT DOCUMENTS

| | | | |
|---|---|---|---|
| 4,781,427 | 11/1988 | Husbands et al. | 359/173 |
| 5,396,357 | 3/1995 | Goossen et al. | 359/119 |
| 5,487,120 | 1/1996 | Choy et al. | 385/24 |
| 5,712,932 | 1/1998 | Alexander et al. | 359/127 |
| 5,724,167 | 3/1998 | Sabella | 359/127 |
| 5,739,935 | 4/1998 | Sabella | 359/127 |

*Primary Examiner*—Edward Lefkowitz
*Attorney, Agent, or Firm*—McAndrews, Held & Malloy, Ltd.

[57] ABSTRACT

A method and apparatus for constructing a modular and easily upgradable optical network node using the technique of wavelength-division multiplexing (WDM). According to the present invention, a WDM point-to-point link end node can be modularly upgraded in the number of wavelength channels or upgraded to a ring network node; both without requiring equipment internal rewiring.

20 Claims, 15 Drawing Sheets

FIG. 2 "Prior Art"

UPGRADABLE MODULAR WAVELENGTH DIVISION MULTIPLEXER

CROSS-REFERENCE TO RELATED APPLICATIONS

The present invention is related to U.S. Pat. No. 5,487,120 issued Jan. 23, 1996 by Choy et al., entitled "Optical Wavelength Division Multiplexer for High Speed, Protocol-Independent Serial Data Sources," which is assigned to the same assignee as the present invention and is hereby incorporated by reference in its entirety.

The present invention was made with government support under contract MDA972-95-C-0001 granted by the Advanced Research Projects Agency (ARPA). The government has certain rights in the present invention.

FIELD OF THE INVENTION

This invention relates to optical communications using the technique of wavelength division multiplexing (WDM).

BACKGROUND

The technology of wavelength division multiplexing (WDM) has been successfully utilized in optical networking in providing high-capacity data transmissions over a single fiber carrying multiple Gb/s wavelength channels.

In the evolution of optical networking, two types of nodes are generally considered: end nodes and network nodes. A WDM point-to-point link involving two end nodes 100 is illustrated by FIG. 1 where bi-directional transmission of 2N wavelength multiplexed channels are achieved using a single or a pair of optical fibers 110. Various types of devices function as the transmitters 101, receivers 102, and multi/demultiplexers 103. Typically, the transmitters 101 and receivers 102 are high-speed optoelectronic devices while the multi/demultiplexers 103 can be fiber-optic or intergrated-optic devices. An example of recently built WDM end node is the IBM model 9729 equipment with 20 wavelengths supporting up to 1 Gb/s per-channel bit rate over a <75 km link; see U.S. Pat. No. 5,487,120, issued Jan. 23, 1996, by Choy et al., "Optical Wavelength Division Multiplexer for High Speed, Protocol-independent Serial Data Sources," which is hereby incorporated by reference in its entirety. Another example is the AT&T next generation lightwave network (NGLN) system with 8 wavelengths supporting SONET OC-48 signals (see C. Fan et al. "Planning the Next Generation Lightwave Network (NGLN) for Capacity Upgrade and Service Growth," presented at the European Institute R&D in Telecom, WDM Workshop Operators and Suppliers, Brussels, Aug. 14, 1995). Other examples include the Ciena 16-wavelength MultiWave Terminal and the Pirelli 32-wavelength WaveMux 3200 product, both supporting OC-48 channels (presented at the SuperComm '96, Dallas, Tex.).

An optical network in the form of a ring is illustrated by FIG. 2 where, in addition to the originating (add) and termination (drop) of traffic as in link end nodes, the ring nodes 202 also perform the function of wavelength routing. It is therefore commonly referred to as an optical add-drop multiplexer (OADM). A self-healing WDM ring network test-bed has been demonstrated by NTT (H. Toba, et al., "An Optical FDM-based Self-healing Ring Network Employing Arrayed Waveguide Grating Filters and EDFA's with Level Equalizers," IEEE Journal of Selected Areas in Communications, vol. 14, pp. 801–813, June 1996) in which up to 15 wavelengths enter the network at the central node while channels of specified wavelength are dropped and added in each remote node. Another OADM recently demonstrated is the Alcatel Telecom MADO prototype (presented at the SuperComm '96, Dallas, Tex.) for 4 wavelengths supporting OC-48 signals. For dynamic wavelength routing, optical space switches 201 are normally required as shown in FIG. 2.

Thus, there is a need for a system and method for modularly upgrading an N-wavelength WDM point-to-point link end node to either a 2N wavelength WDM point-to-point link end node or to a ring node having the required add-drop capabilities. The present invention addresses such a need.

SUMMARY

In accordance with the aforementioned needs, the present invention is directed to an upgradable modular wavelength division multiplexer functioning as a WDM point-to-point link end node or as a dual-fiber bidirectional ring network node. Neither upgrade path involves rewiring within units and external connections between units are preferably achieved by fiber ribbon cables.

A modularly upgradable multi-channel optical node according to the present invention includes: a receive/transmit unit including at least one electrical-to-optical transmitter and at least one optical-to-electrical receiver; a MUX/DEMUX unit including at least one optical multiplexer and at least one optical demultiplexer; an interconnection unit upgradably coupling the transmitter to the multiplexer and the receiver to the demultiplexer; wherein the optical node is upgradable in a number of channels or in a degree of the node by coupling a second transmitter to the multiplexer and a second receiver to the demultiplexer via the interconnection unit.

According to another aspect of the present invention, the optical node may be modularly upgraded for reconfigurable routing to be done in a network node by coupling and interposing a switch unit between the interconnection unit and the MUX/DEMUX unit, wherein the switching unit includes a plurality of optical space switches.

According to yet another aspect of the present invention, the interconnection unit is a fiber ribbon cable such that a change in direction of transmission on a line of the fiber is achieved by a change to a second fiber ribbon cable having one or more pairs of fibers that are interchanged therein.

According to still another aspect of the present invention, the multiplexer and the demultiplexer is implemented as a bidirectional arrayed-waveguide grating, and the interconnection unit includes a fiber interconnection cable for each channel. The cable includes a plurality of fibers coupling the first transmitter to the multiplexer associated with the bi-directional arrayed-waveguide grating and the first receiver to the demultiplexer associated with the bidirectional arrayed-waveguide grating, wherein the node can be upgraded without internally rewiring any unit.

BRIEF DESCRIPTION OF THE DRAWINGS

For additional features and advantages of the present invention, refer to the accompanying detailed description and drawings, wherein.

DETAILED DESCRIPTION

The present invention is directed to an easily upgradable, field reconfigurable optical network node usable in three different optical network architectures. Each configuration will be treated in a separate section.

16 Wavelength Point-to-Point Link

Figure 1:
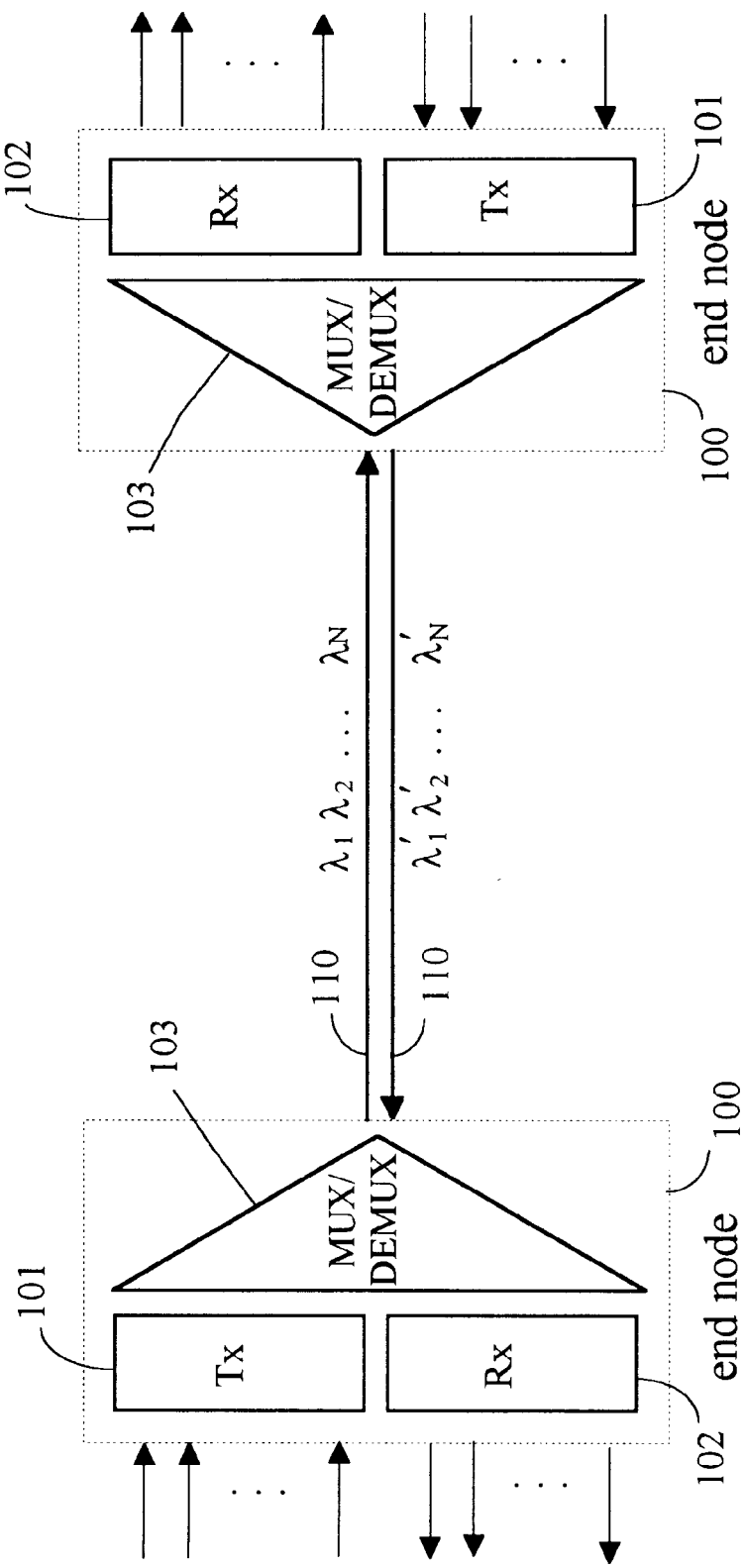
FIG. 1 depicts a prior art WDM point-to-point link.
Figure 2:
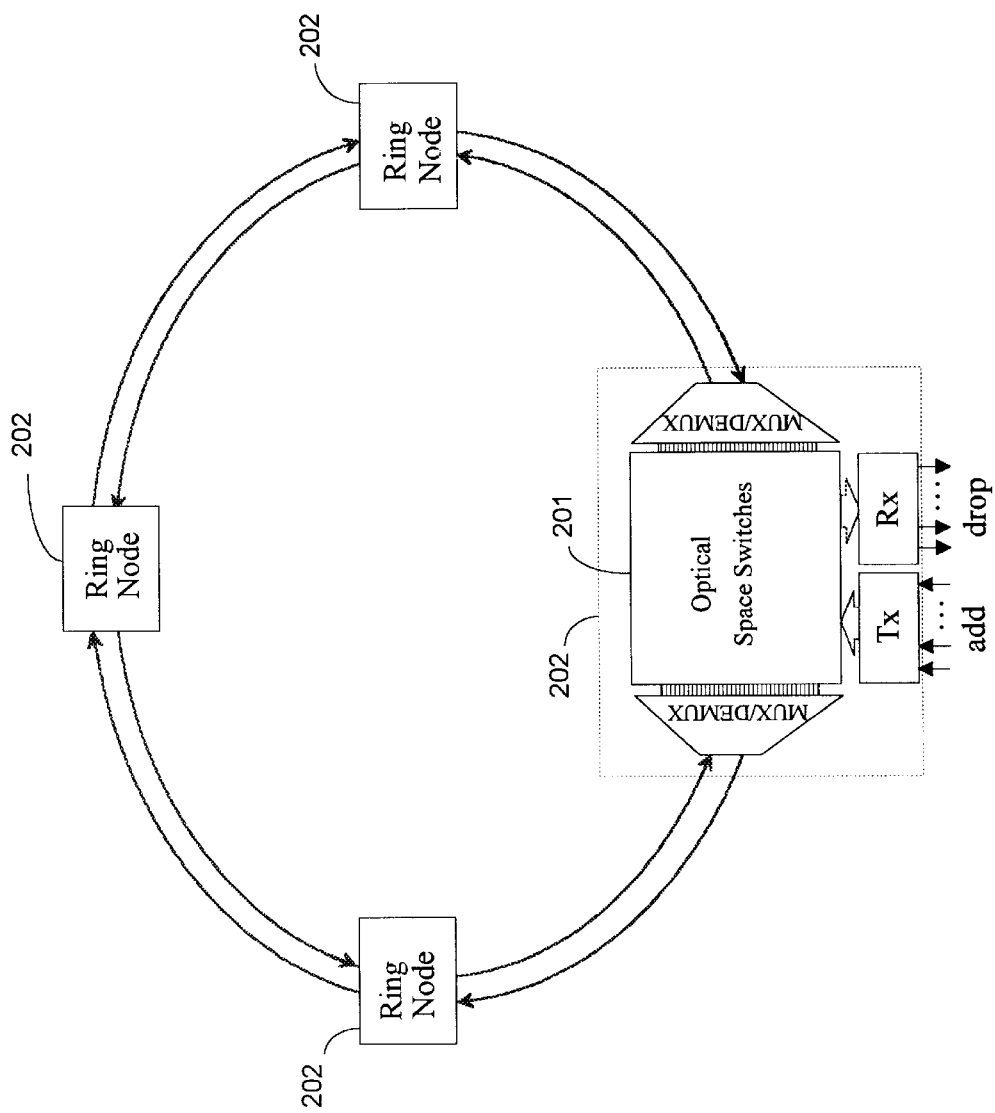
FIG. 2 depicts a prior art optical ring network with dynamic channel add/drop.
Figure 3:
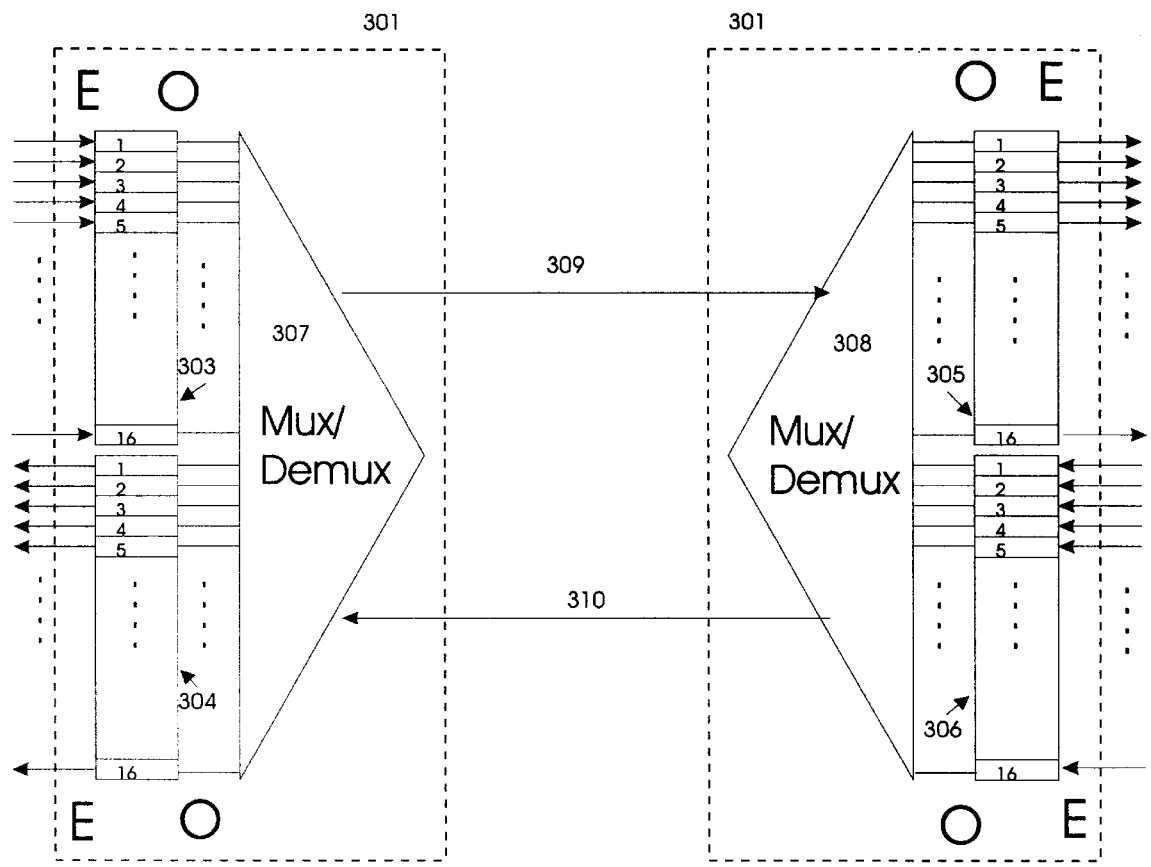
FIG. 3 depicts a 16-wavelength WDM point-to-point link.

FIG. 3 depicts a block diagram of a 16-channel WDM point-to-point link. In this architecture, two optical nodes 301, 302 are necessary, one at each end of the communication link. Each node includes a series of 16 electrical-to-optical (E/O) transmitter modules 303, 306 which convert the incoming electrical data streams into modulated light outputs. As is conventional, the transmitters include lasers and associated driving electronics. Each transmitter 303, 306 broadcasts on its own individual wavelength, as is conventional in WDM systems. Each optical node also includes a series of 16 optical-to-electrical (O/E) receiver modules 304, 305 which convert the modulated light inputs into electrical data stream outputs. As is conventional, the optical receivers include high-speed photodiodes and associated drive electronics. After E/O conversion, the multiplicity of separate wavelengths are multiplexed onto a single optical fiber using a MUX module in the MUX/DEMUX unit 307, 308. The MUX receives the incoming light arriving from all the transmitters on separate optical fibers, and multiplexes it onto a single optical fiber 309, 310 for transmission to the receiving node. At each node, multiplexed light arriving on the receiving fiber 309, 310 is separated into its constituent wavelengths using a DEMUX in the MUX/DEMUX unit 307, 308, and each wavelength is directed to its associated receiver in the receiver modules 304, 305. For the 16-wavelength architecture, a single 2×32 AWG may be used at each node to perform both wavelength multiplexing and demultiplexing, as described in the paper by O. Ishida et al. ("Multichannel Frequency-selective Switch Employing an Arrayed-Waveguide Grating Multiplexer with Foldback Optical Paths," IEEE Photonics Technology Letters, vol. 6, pp. 1219–1221, Oct. 1994).

Figure 4:
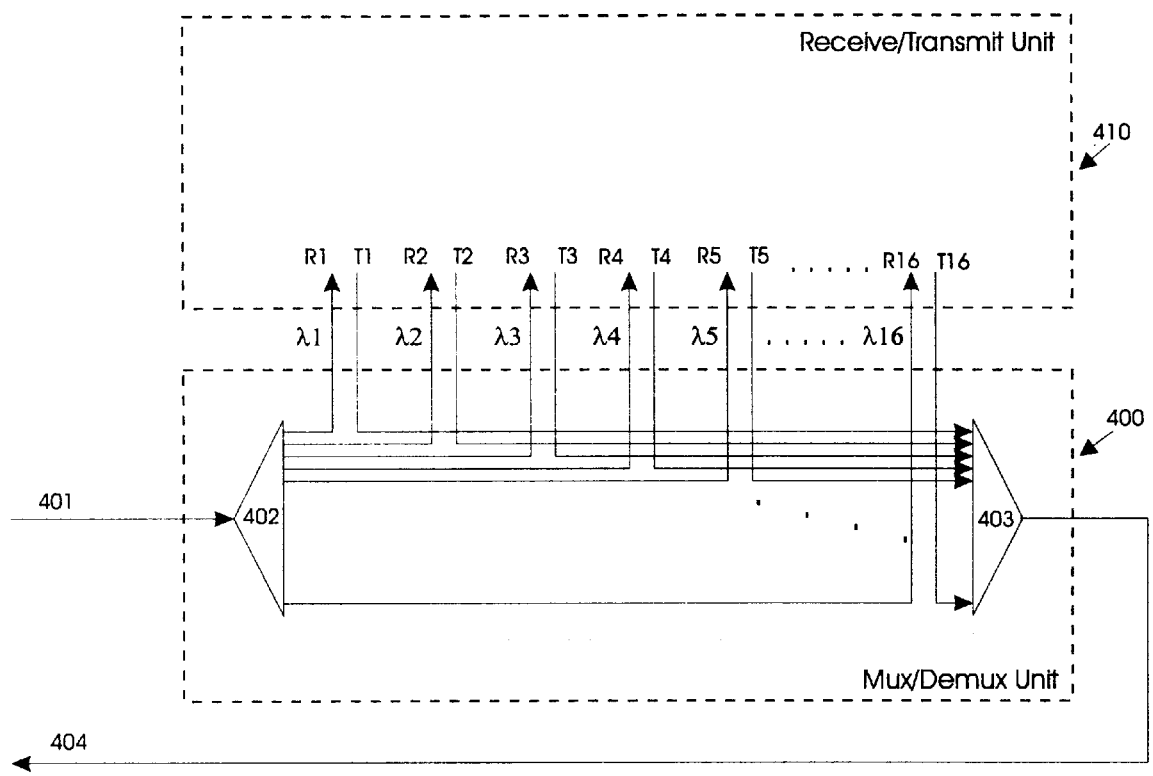
FIG. 4 depicts a logical view of a 16-wavelength WDM point-to-point link end node having features of the present invention.

FIG. 4 depicts an example of a logical schematic diagram of a 16-wavelength WDM point-to-point link end node. Within each node the packaging scheme of various components is preferably modular. As depicted in FIG. 4, the MUX/DEMUX unit 400 preferably resides in a separate box (i.e. rack mountable unit) from the receive/transmit unit 410. Entering from the left is the incoming fiber 401 carrying 16 wavelengths of modulated light to be received. The wavelengths carried on the incoming fiber 401 are demultiplexed onto 16 separate optical fibers using the DEMUX module 402. These 16 separate fibers are directed to the receivers R1–R16. Meanwhile, 16 different wavelengths on 16 different fibers are coupled to the MUX module 403 from the transmitters T1–T16. MUX 403 combines all these separate wavelengths onto a single output fiber 404, and these wavelengths are subsequently sent to the other node in the link.

Figure 5:
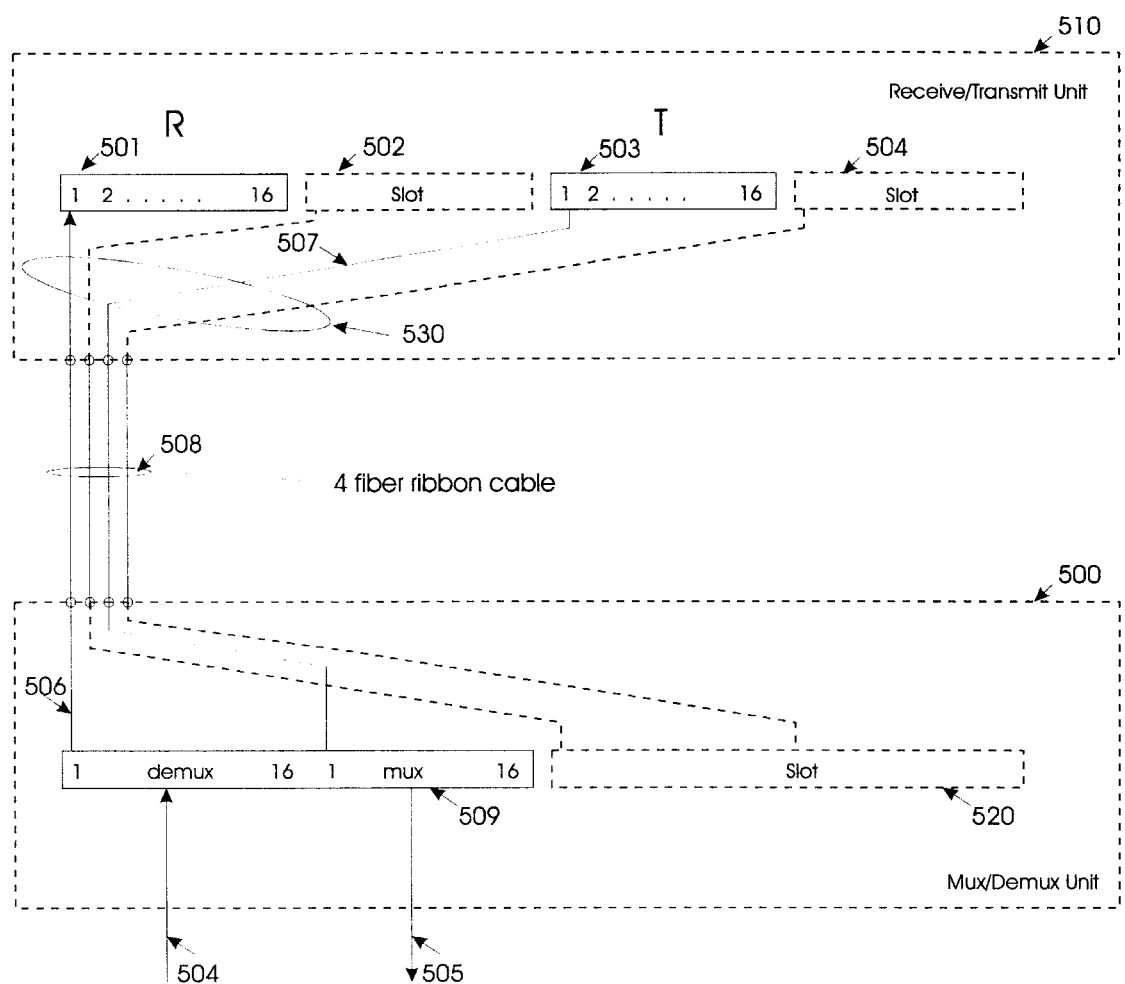
FIG. 5 depicts an interbox wiring diagram of a 16-wavelength WDM point-to-point link end node having features of the present invention.

FIG. 5 schematically depicts an example of the internal connections between the MUX/DEMUX unit 500 and the receive/transmit unit 510 for a 16-wavelength point-to-point link end node having features of the present invention. The top row of rectangles correspond to a set of 16 optical receiver modules 501 and a set of 16 optical transmitter modules 503. The numbers in the receiver and transmitter modules signify the channel number, i.e., wavelength. Two fibers are coupled to the MUX/DEMUX unit 500: a receive fiber 504, and a transmit fiber 505. As described earlier, the 1×16 MUX and 1×16 DEMUX can be implemented by using a single 2×32 AWG module 509. The 16 demultiplexed wavelengths at ports 1 through 16 at the DEMUX output of 509 are directed to the receivers 501 via fiber ribbon cable 508. For simplicity, path 506 is shown connecting DEMUX port 1 to receiver 501 channel 1. The remaining 15 optical channels are similarly connected. Since the MUX/DEMUX unit 500 and the receive/transmit unit 510 preferably reside in separate boxes, these connections are achieved by fiber ribbon cable 508, as described in the next paragraph. Along with the received light, the 16 individual transmitted wavelengths to be multiplexed are carried from the transmitter 503 to the MUX/DEMUX module 509 via the path 507, which for simplicity is shown connecting transmitter channel 1 to MUX input port 1 of the module 509. The remaining 15 optical channels are similarly connected.

Preferably, the 4-fiber ribbon cable 508 is used to carry signals between the modular MUX/DEMUX unit 500 and receive/transmit unit 510. According to the present invention, the wiring pattern used in the fiber ribbon cable depends on the network architecture desired. Each 4-fiber ribbon cable is segregated on a wavelength basis, meaning that a separate 4-fiber ribbon cable is used to carry the transmitted and received light for each wavelength. Note that in the 16 channel architecture, only two fibers of the ribbon cable 508 will actually be lit; the other two fibers are not used, and act as place holders for the upgrade, which will be described with reference to FIG. 8. Alternatively, the two unlit fibers in the ribbon cable 508 can be omitted from the cable.

Those skilled in the art will appreciate that alternative arrangements, within the spirit and scope of the present invention, are available. Further alternative embodiments in accordance with the present invention will be discussed with reference to FIGS. 12–14.

32 Wavelength Point-to-Point Link

Figure 6:
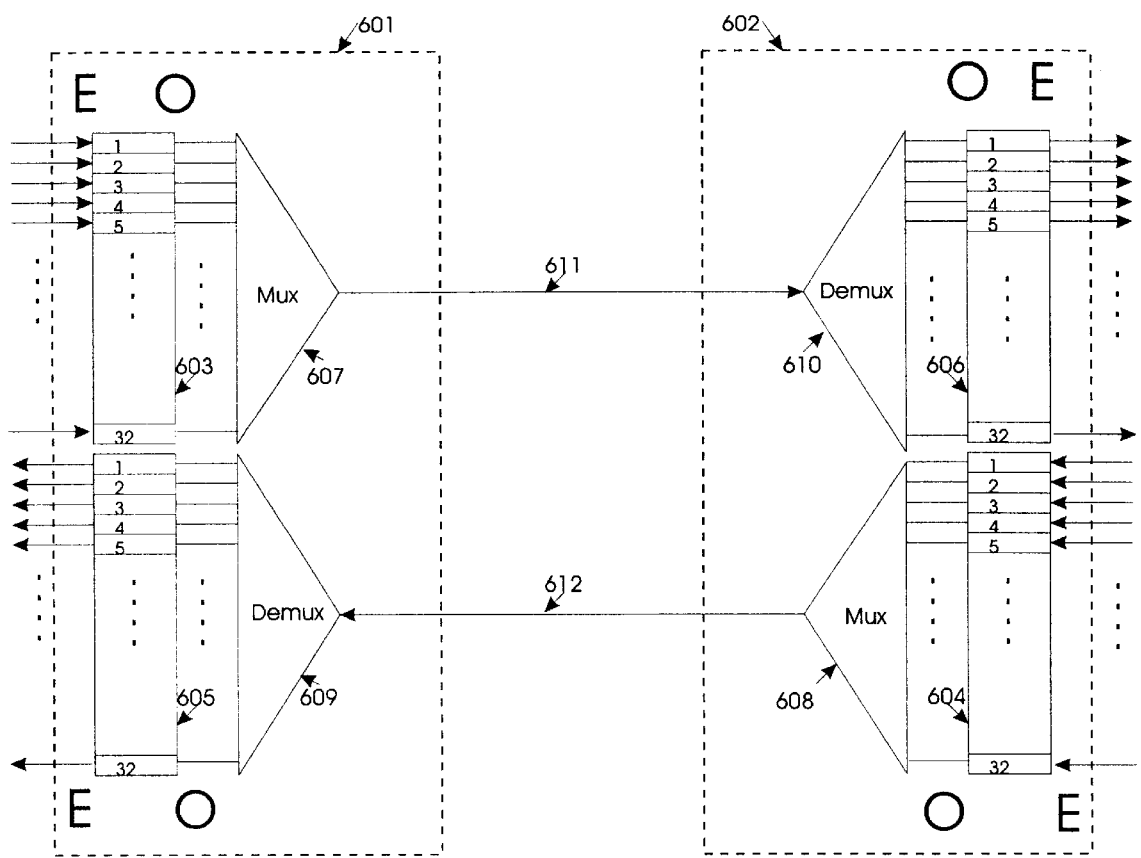
FIG. 6 depicts a 32-wavelength WDM point-to-point link.
Figure 7:
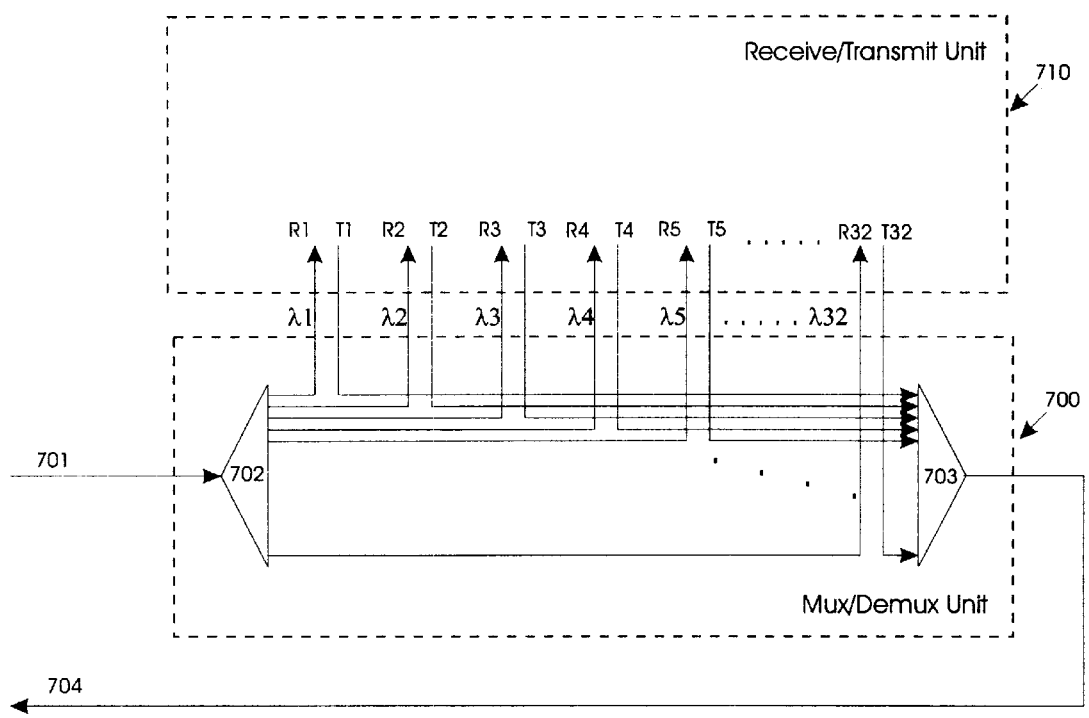
FIG. 7 depicts a logical view of a 32-wavelength WDM point-to-point link end node having features of the present invention.

The second major architectural configuration, shown in FIG. 6, is a 32-channel WDM point-to-point link. In this architecture, two optical node units 601, 602 are necessary, one at each end of the communication link. As depicted, at each node one 1×32 MUX 607, 608 and a 1×32 DEMUX 609, 610 are used. Each optical node 601, 602 includes a series of 32 E/O transmitter modules 603, 604 which convert incoming electrical data streams into modulated light outputs. As is conventional, the optical transmitters include lasers and associated driving electronics. Each optical transmitter broadcasts on its own individual wavelength, as is also conventional in WDM systems. Each optical node 601, 602 also includes a series of 32 O/E receiver modules 605, 606, which convert the modulated light inputs into electrical data streams. As is conventional, the optical receivers include high-speed photodiodes and associated drive electronics. After E/O conversion, the multiplicity of separate wavelengths are multiplexed onto a single optical fiber 611, 612 using a MUX 607, 608 for transmission to the receiving node. At each node, multiplexed light arriving on the receiving fiber 611, 612 is separated into its constituent wavelengths using a DEMUX 609, 610 and each wavelength is directed to its respective receiver in the receiver modules 605, 606. FIG. 7 depicts an example of a logical schematic diagram of a 32-wavelength point-to-point link end node. The packaging scheme of various components within the node is preferably modular. As depicted in FIG. 7, the MUX/DEMUX unit 700 preferably resides in a separate box (i.e. rack mountable unit) from the receive/transmit unit 710. An incoming fiber 701 carries 32 wavelengths of modulated light to be received. The wavelengths carried on the incoming fiber are demultiplexed onto 32 separate optical fibers using the DEMUX module 702. These 16 separate wavelengths are directed to the associated receivers R1–R32. Meanwhile, 32 different wavelengths on 32 different fibers are coupled to the MUX module 703 from the transmitters T1–T32. MUX 703 combines all these different wavelengths onto a single output fiber 704 for transmission to the other node in the link.

Figure 8:
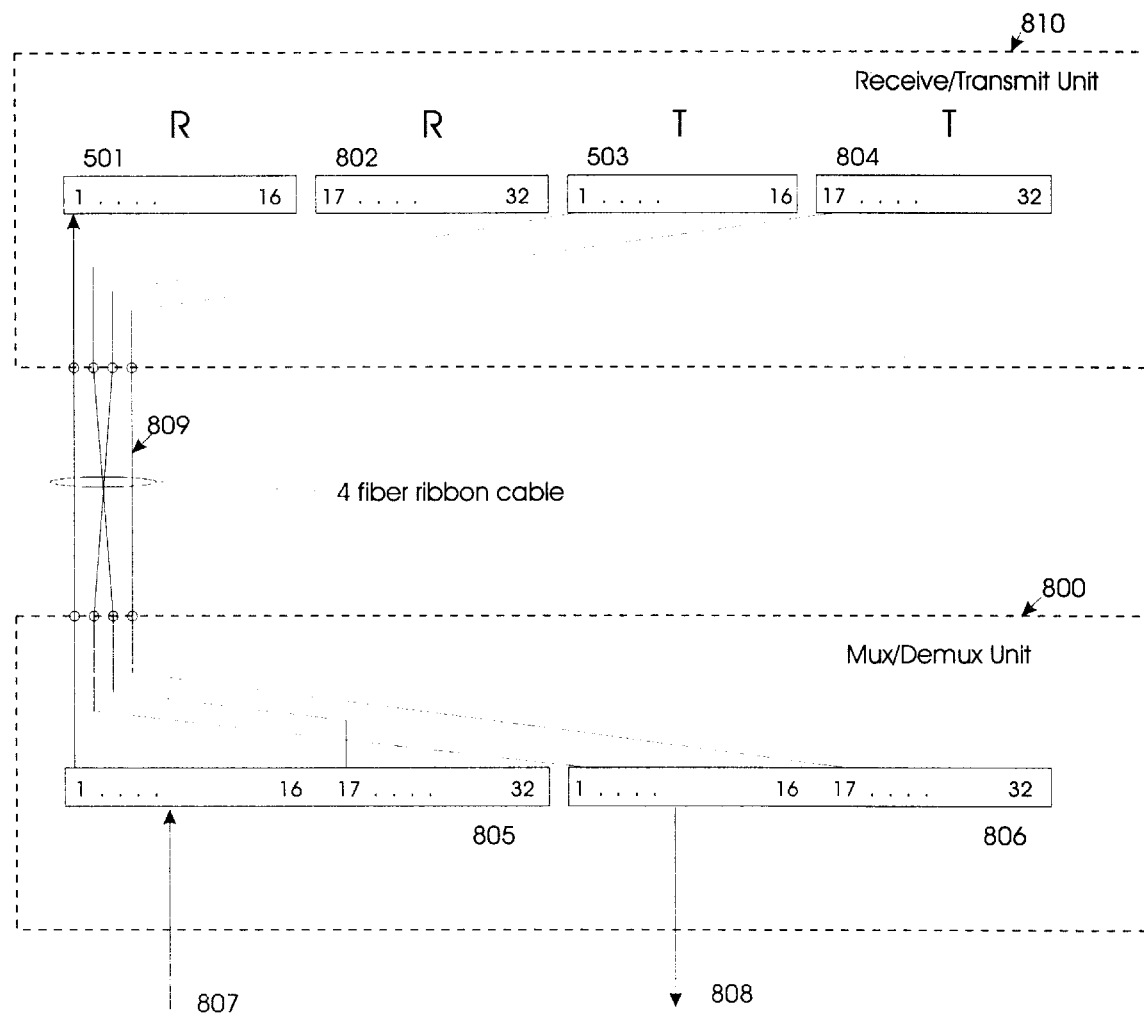
FIG. 8 depicts an interbox wiring diagram of a 32-wavelength WDM point-to-point link end node which has been upgraded in accordance with the present invention.

FIG. 8 schematically depicts an example of the internal connections between the MUX/DEMUX unit 800 and the receive/transmit unit 810 for a 32-wavelength point-to-point link end node having features of the present invention. The receive/transmit unit 810 includes two sets of 16 channel optical receiver modules 501 and 802 for 32 received wavelengths, and two sets of 16 channel optical transmitter modules 503 and 804 for 32 transmitted wavelengths. The numbers in the receivers 501, 802 and transmitters 503, 804 represent the channel numbers, i.e. wavelengths. The MUX/DEMUX unit 800 includes 1×32 DEMUX 805 and 1×32 MUX 806 in the 32-wavelength configuration. DEMUX 805 separates the 32 incoming wavelengths on fiber 807 and directs them to the receiver modules 501 and 802. MUX 806 combines all the wavelengths transmitted by the transmitter modules 503 and 804 onto the single output fiber 808. In the 32-wavelength configuration of FIG. 8, all four fibers in the ribbon cable 809 connecting the MUX/DEMUX unit 800 to the receive/transmit unit 810 are used. Assume that the fiber wiring inside units 800 and 810 is identical to units 500 and 510, and the that ribbon cable 809 has the two center fibers criss-crossed.

16 Wavelength WDM Ring

Figure 9:
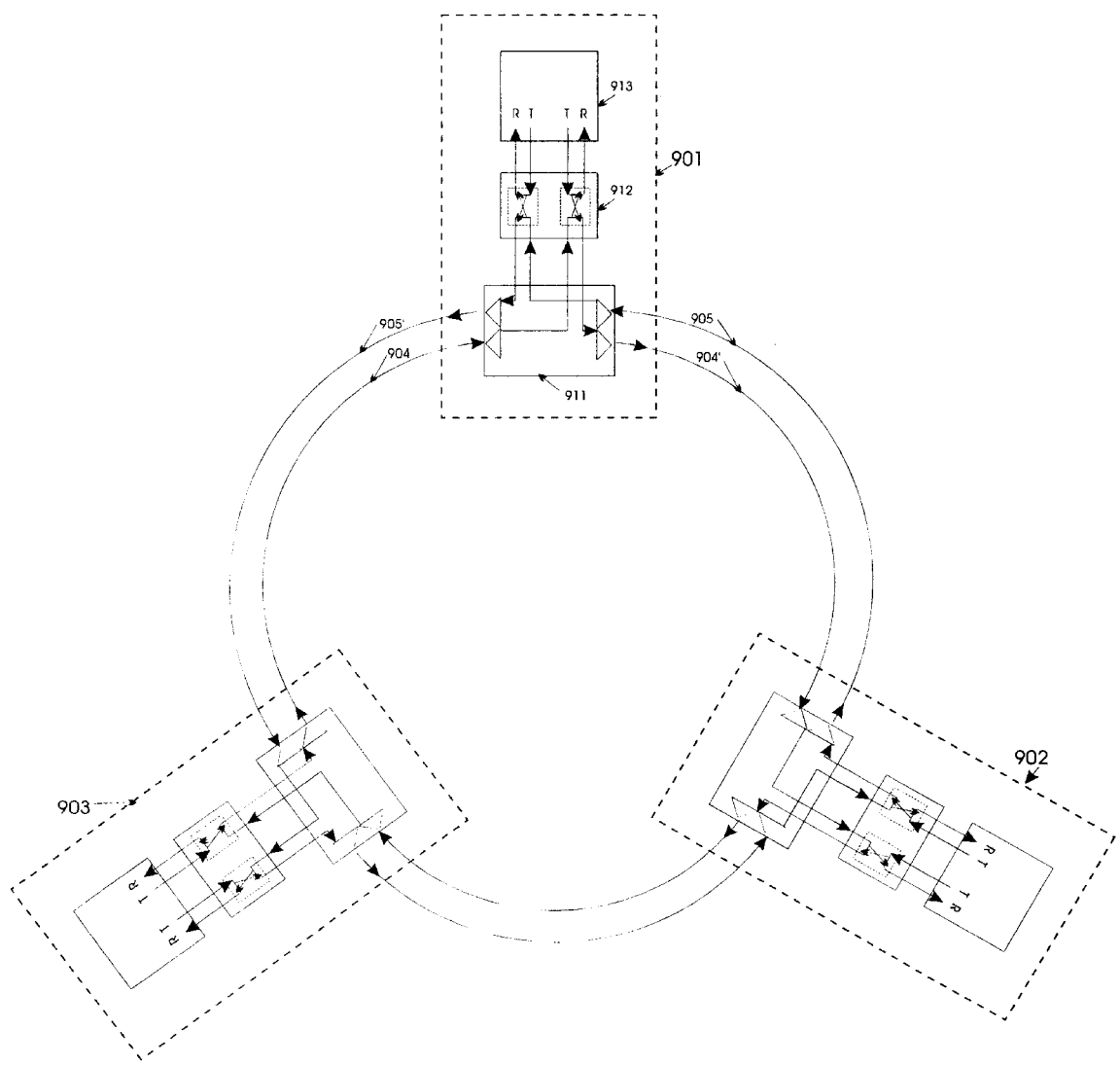
FIG. 9 depicts a dual-fiber bidirectional WDM ring network.

The third architectural configuration is a dual-fiber bi-directional WDM ring, shown in FIG. 9. For simplicity, a three node network is shown. The architecture, however, is not limited to 3 nodes, and may contain an arbitrarily large number of nodes. Each node 901–903 is a dynamic OADM and is linked to its neighboring nodes via two fibers; one fiber describes a clockwise (CW)running ring 904/904', the other describing a counterclockwise (CCW) ring 905/905'. Each node includes a MUX/DEMUX unit 911, a receive/transmit unit 913, and an optical space switch unit 912 for dynamic channel add/drop. Various types of optical space switches operated under various mechanisms are commercially available such as electro-optic, magneto-optic, thermo-optic, micro-mechanical, and acousto-optic switches.

Figure 10:
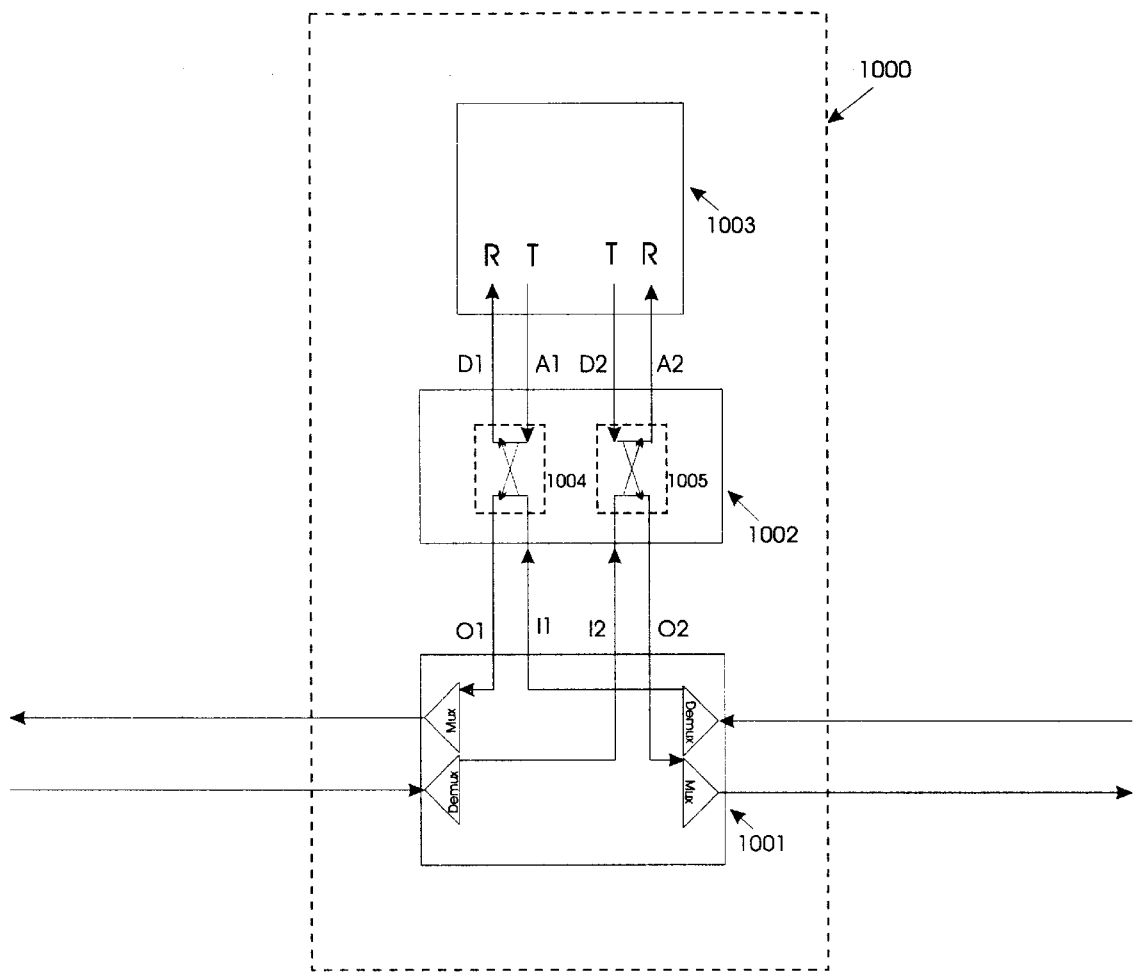
FIG. 10 depicts one node in the optical ring network of FIG. 9.

FIG. 10 depicts an example of one of the optical ring network nodes of FIG. 9. As depicted, a node 1000 consists of three units: a MUX/DEMUX unit 1001, an add/drop switch unit 1002, and a receive/transmit unit 1003. The functions of the MUX/DEMUX unit 1001 and the receive/transmit unit 1003 have been described previously. The switch unit 1002, as illustrated in FIG. 10, contains two 2×2 space switches 1004 and 1005 for each wavelength, one for each ring direction (CW or CCW). On a per-wavelength basis, the switches either pass traffic through the node transparently (ports $I_1$ to $O_1$ and $I_2$ to $O_2$) or switch it to a receiver (drop, $I_1$ to $D_1$ and $I_2$ to $D_2$) while capable of simultaneously switching a transmitter output onto the downstream portion of the fiber (add, $A_1$ to $O_1$ and $A_2$ to $O_2$).

Figure 11:
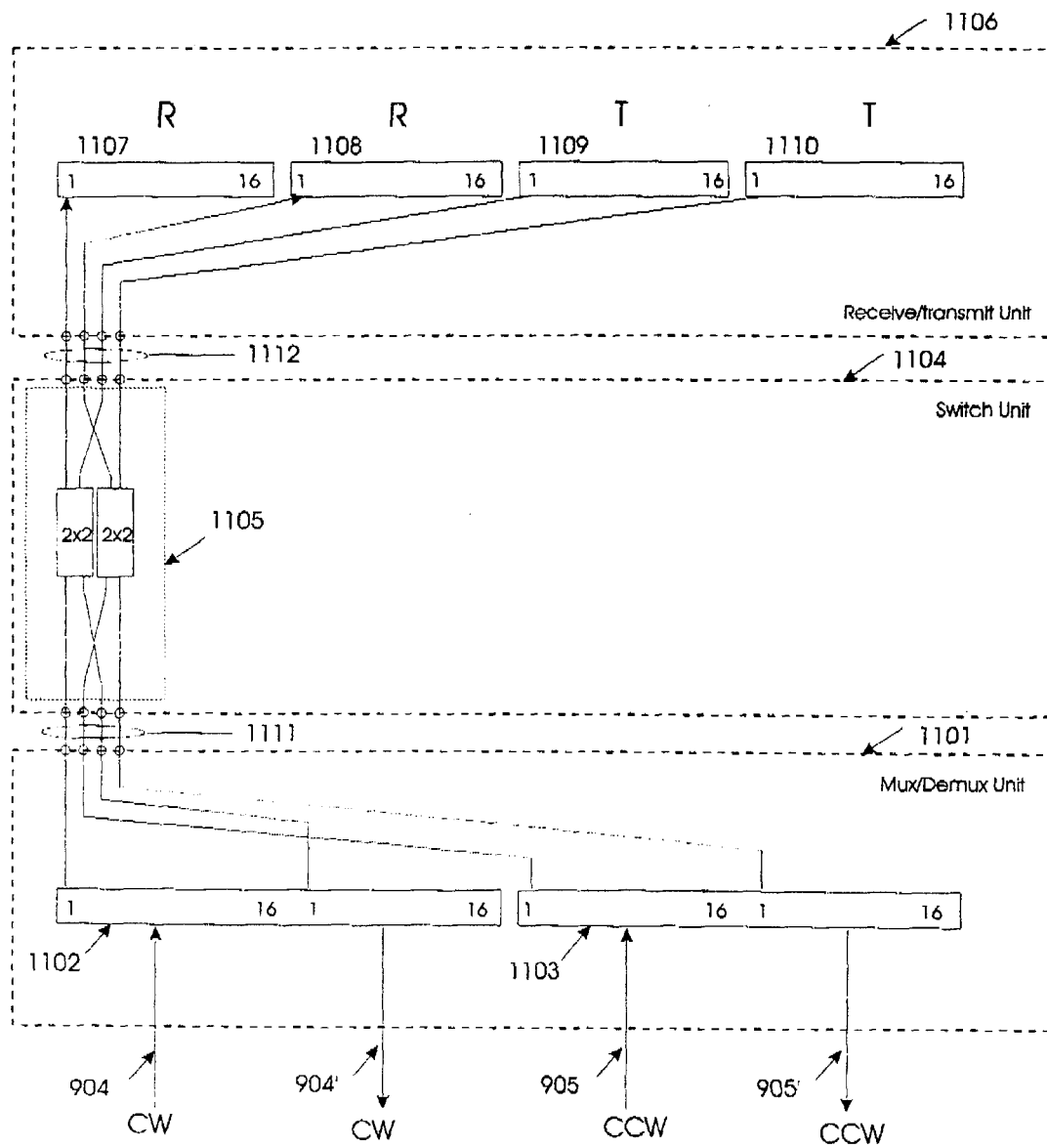
FIG. 11 depicts an interbox wiring diagram of a 16-wavelength WDM optical ring node which has been upgraded in accordance with the present invention.

FIG. 11 depicts the wiring diagram between the three boxes comprising the ring network node 1000. The MUX/DEMUX unit 1101 contains two 2×32 MUX/DEMUX modules 1102, 1103, one for the CW transmission (1102) and the other for the CCW transmission (1103). AS described pertaining to FIG. 5, a single 2×32 AWG can be used as the module 1102 or 1103 to perform both multiplexing and demultiplexing. Inside the unit 1101, fibers connected to the modules 1102, 1103 are segregated on a wavelength basis and combined onto a single 4-fiber ribbon cable 1111 to carry the light to the switch unit 1104. The switch unit 1104 includes 16 switch modules, one module for each wavelength. Each switch module 1105 contains two 2×2 switches, allowing light from either direction (CW or CCW) to be dropped or simply passed through the network node. On the other side of the switch unit 1104, a 4-fiber ribbon cable 1112 directs the light to the receive/transmit unit 1106 for each wavelength. Assume that the fiber wiring inside the units 1101 and 1106 is identical to units 500 and 510, respectively, of FIG. 5, and that the ribbon cables 1111 and 1112 are standard, i.e., have straight-through connections.

Upgrading from a 16 to a 32 Wavelength Point-to-Point Link

According to the present invention, consider the steps necessary to construct a 32-wavelength point-to-point link node shown in FIG. 8 from a pre-existing 16-wavelength point-to-point link node shown in FIG. 5. The same operations are obviously duplicated in the other end node. The 2×32 MUX/DEMUX module 510 is re-used fully as a 1×32 receiving DEMUX module 805. The input fiber 504 is reused as input fiber 807, but the output fiber 505 is now unused. Similarly, receivers for wavelengths 1–16 in the receiver modules 501 of FIG. 5 are fully re-used as receivers for wavelengths 1–16 in FIG. 8; and transmitter modules 503 of FIG. 5 is also fully re-used in FIG. 8. The additional 16 wavelengths may be supported by the addition of an identical MUX 806, receiver modules 802, and transmitter modules 804 in the reserved slots 520, 502, 504 in the 16-wavelength system of FIG. 5. The added MUX 806 provides the output fiber 808 for the 32-wavelength link node. A total of 16 ribbon cables are used, the same as for the 16-wavelength configuration, however all 4 fibers in each ribbon are now lit. Because the upgrade has changed a bi-directionally illuminated MUX/DEMUX 509 into a unidirectional DEMUX 805, the wiring configuration of the ribbon cable 809 from the MUX/DEMUX unit 800 to the receive/transmit unit 810 has to be changed. According to the present invention, complicated rewiring inside the receive/transmit 810 or MUX/DEMUX unit 800 is advantageously avoided. Specifically, the 16 ribbon cables with each cable 508 carrying one unique wavelength, used in the 16-wavelength scheme of FIG. 5, are replaced by 16 different ribbon cables with each cable 809 carrying 2 wavelengths. For example, cable 809 as shown carries wavelength 1 and wavelength 17 in both directions. The next cable carries both directions of wavelengths 2 and 18 and so forth. These new cables are not identical in function and therefore are preferably distinguished in appearance to avoid confusion. Specifically, the cable 809 has a crossing of the center two fibers as shown in FIG. 8, whereas cable 508 of FIG. 5 does not have any crossings.

Upgrading from a 16 Wavelength Link to a 16 Wavelength Ring

The same operations of adding transmitter modules 1110, receive modules 1108, and a MUX/DEMUX module 1103 apply here as in the upgrade from 16-wavelength link to the 32-wavelength link. In this case, output fiber 505 may be re-used as the output fiber for the CW ring 904/904'. Unlike the 32-wavelength link upgrade, however, the added transmitter modules 1110, receiver modules 1108, and MUX/DEMUX module 1103 in FIG. 11 operate at the same wavelengths 1–16 as the pre-existing units in FIG. 5. In addition, a space switch unit 1104 is added between the receive/transmit unit 1106 and MUX/DEMUX unit 1101. The two ribbon cables 1111, 1112 used to connect the switch unit 1104 to the receive/transmit unit 1106 and the MUX/DEMUX unit 1101 are the same as in the 16-wavelength link (i.e. no crossings) and all 4 fibers per cable are lit. In this case, however, each cable carries only signals at the same wavelength.

Alternative Embodiment

16 Wavelength Point-to-Point Link

Figure 12:
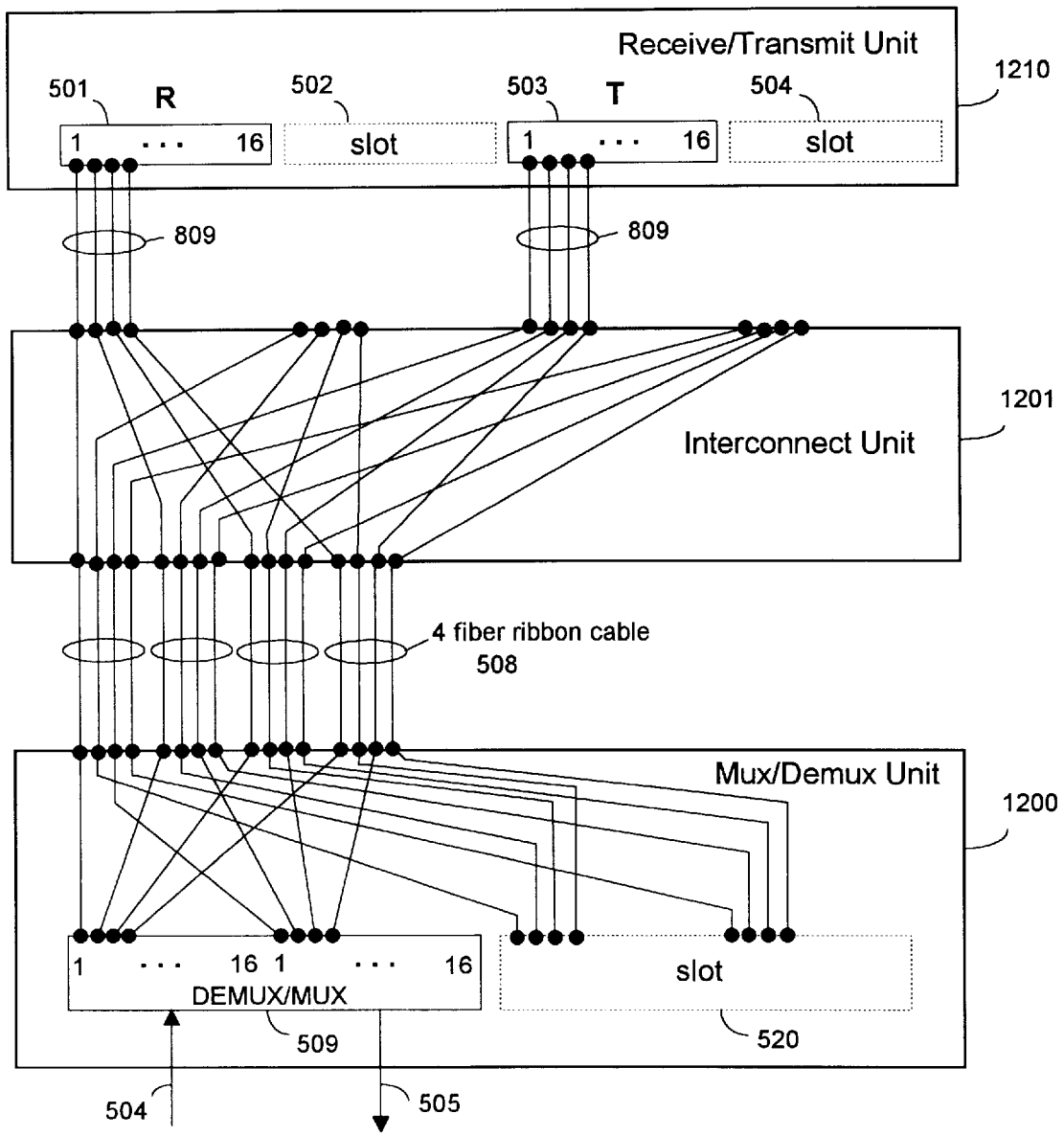
FIG. 12 depicts an alternative embodiment of an interbox wiring diagram of a 16-wavelength WDM point-to-point link end node having features of the present invention.

An alternative packaging scheme for implementing the 16-wavelength WDM point-to-point link end node of FIG. 5 is shown in FIG. 12. In this configuration the MUX/DEMUX unit 1200 is arranged same as in FIG. 5. However, in accordance with the present invention, an interconnect unit 1201, is placed between the receive/transmit unit 1210 and the MUX/DEMUX unit 1200. The interconnect unit 1201 contains the fiber wiring 530 which was inside the receive/transmit unit 510 in the embodiment depicted in FIG. 5. The interconnect unit 1201 couples the receiver modules 501 and transmitter modules 503 to the proper ports of the MUX/DEMUX unit 1200 using the ribbon cables. Wiring details of the interconnect unit 1201 associated with the wavelengths 1–4 are shown in FIG. 12. The associated wiring for the remaining 12 wavelengths can be done similarly. As will be described with reference to FIG. 13, the introduction of the interconnect unit 1201 provides advantageous features for upgrading the system to 32 wavelengths. The connection from the receiver modules 501 and the transmitter modules 503 to the interconnect unit 1201 and from the interconnect unit 1201 to the MUX/DEMUX unit 1200 are accomplished using standard 4-fiber ribbon cables 508 without fiber crossings.

Upgrading from a 16 to a 32 Wavelength Point-to-Point Link

Figure 13:
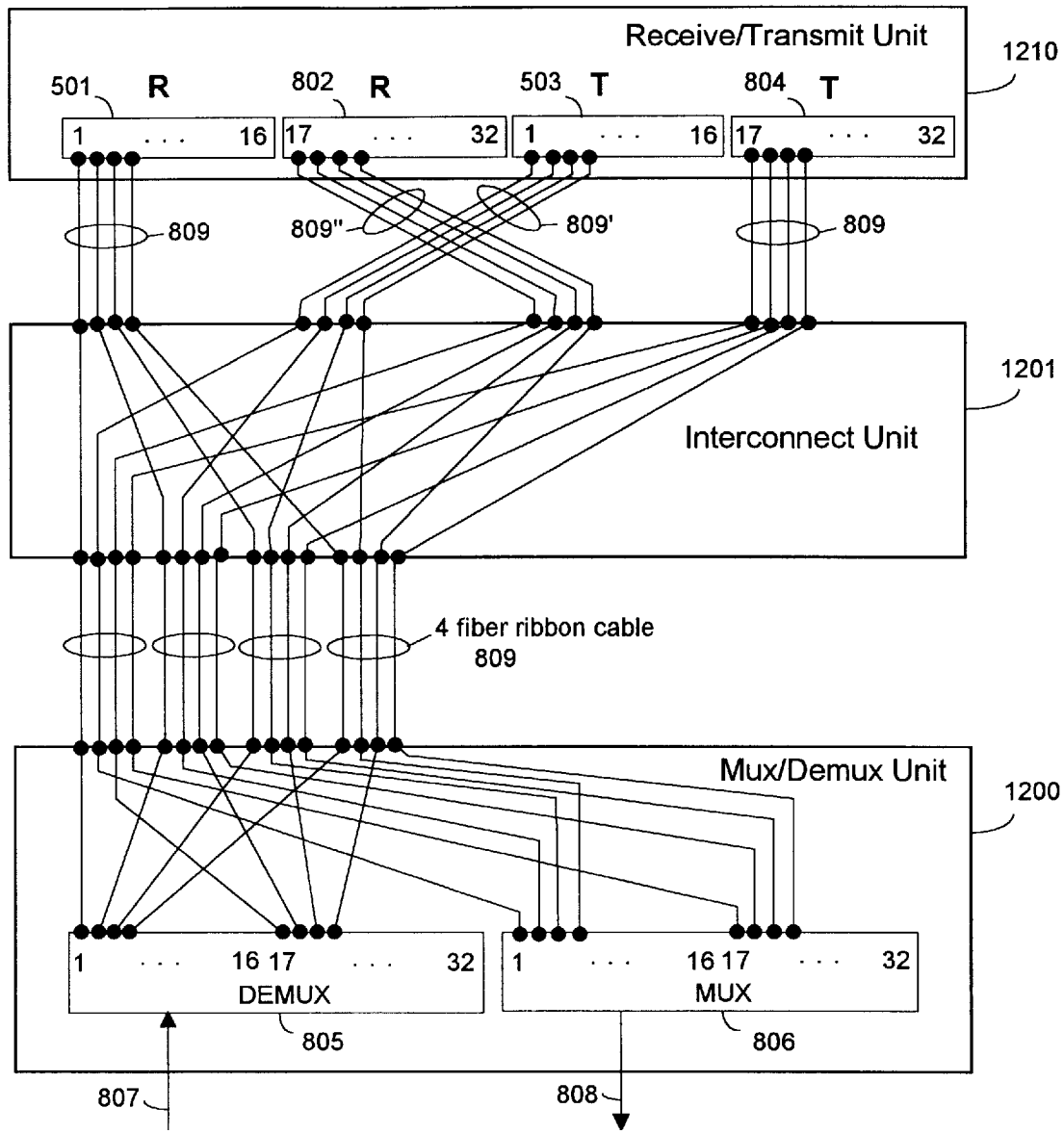
FIG. 13 depicts an alternative interbox wiring diagram of a 32-wavelength WDM point-to-point link end node which has been upgraded in accordance with the present invention.

FIG. 13 depicts a 32-wavelength end node upgraded from the 16-wavelength end node of FIG. 12 in accordance with the present invention. As depicted, a second set of receiver modules 802 and transmitter modules 804 are plugged in the slots 502, 504 of the receive/transmit unit 1210 in FIG. 12. A second MUX module 806 is also plugged in the slot 520. Note that the interconnect unit 1201 is connected to the MUX/DEMUX unit 1200 and the receive/transmit unit 1210 using standard ribbon cables 809 without fiber crossings, in contrast to the requirement of the original packaging scheme of FIG. 8. The modules 802 and 503, however, are connected to the interconnect unit 1201 differently. Specifically, the ribbon cables 809' and 809" which connect the interconnect unit 1201 to transmitter 503 and receiver 802, respectively, are crossed as illustrated in FIG. 13. Such a packaging scheme removes the need for customized ribbon cable with center two fibers interchanged as depicted in the original packaging scheme of FIG. 8.

Upgrading from a 16 Wavelength Link to a 16 Wavelength Ring

Figure 14:
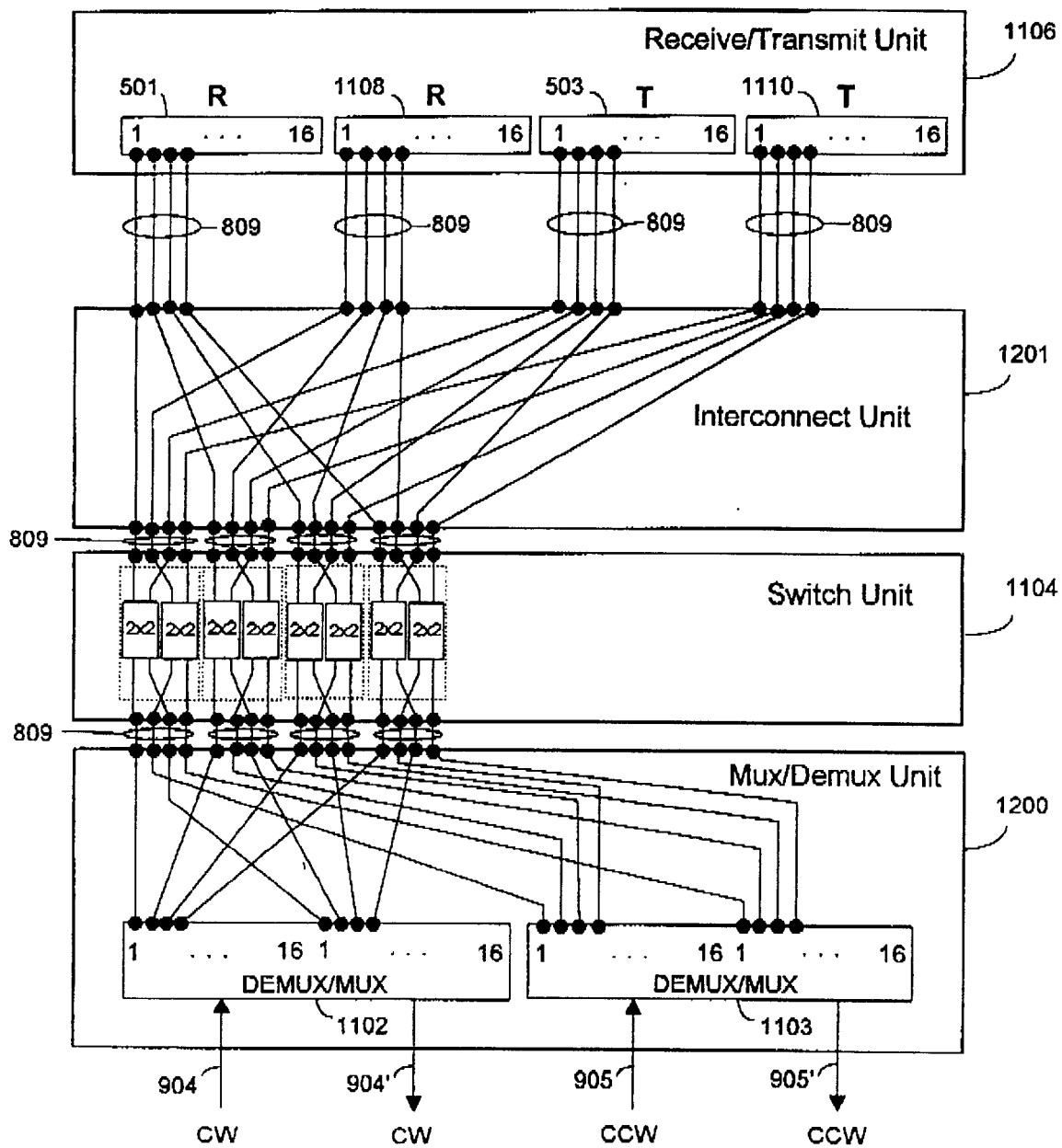
FIG. 14 depicts an alternative interbox wiring diagram of a 16-wavelength WDM optical ring node which has been upgraded in accordance with the present invention.

FIG. 14 depicts a 16-wavelength ring node upgraded from the 16-wavelength unit of FIG. 12 in accordance with the present invention. The same steps of adding a second set of receiver modules 1108, transmitter modules 1110, and MUX/DEMUX module 1103 apply here as in the upgrade from a 16-wavelength link to a 32-wavelength link under the original packaging scheme as depicted in FIG. 11. The switch unit 1104 (also in FIG. 11) couples the interconnect unit 1201 to the MUX/DEMUX unit 1200. The switch unit 1104 performs the same add/drop function as described with reference to FIG. I1. Referring again to FIG. 14, the ribbon cables 809 connecting the receive/transmit unit 1106 to the interconnect unit 1201 (unlike FIG. 13) all run straight up and down. The interconnect unit 1201 thus eliminates the need for customized ribbon cable. The CW 904/904' and CCW 905/905' input/output fibers are connected to the MUX/DEMUX modules 1102 and 1103, respectively, in the same way as in FIG. 11.

Now that the invention has been described by way of a preferred embodiment, various modifications and improvements will occur to those of skill in the art. For example, the optical space switch unit 1002 for a dual-fiber bidirectional ring network node of FIG. 10 can be expanded from two independent 2×2 switches 1004 and 1005 to a 4×4 configuration to provide the additional functions of cross-add (A1 to O2 and A2 to O1), cross-drop (I1 to D2 and I2 to D1), and cross-pass (I1 to O2 and I2 to O1).

Figure 15:
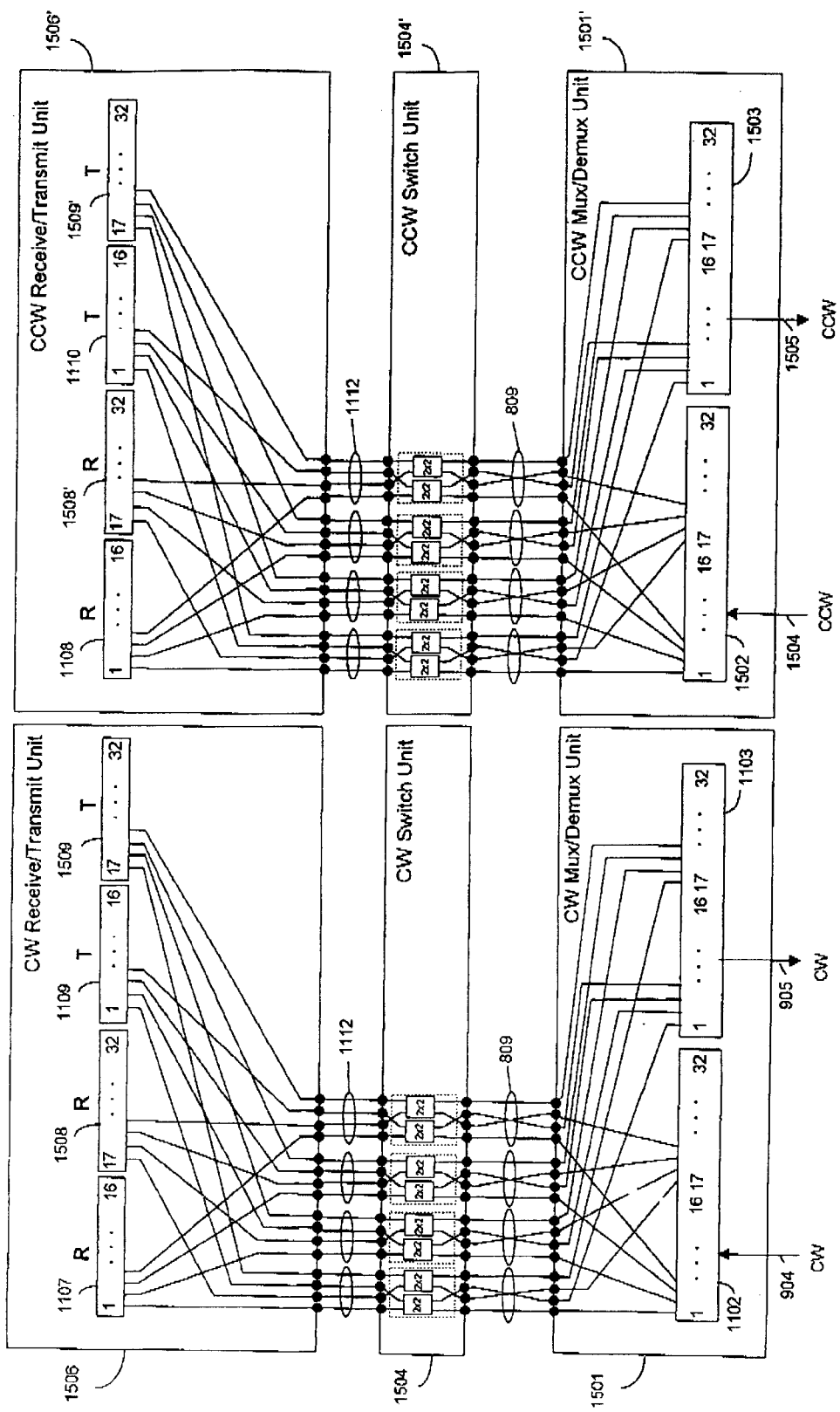
FIG. 15 depicts an interbox wiring diagram of a 32-wavelength WDM optical ring node which has been upgraded in accordance with the present invention.

Another alternative is to upgrade from 16 wavelengths to 32 wavelengths for a dual-fiber bi-directional ring node. This upgrade can be achieved by, for instance, incorporating two 16-wavelength ring-node system units of FIG. 11 into a single node. As schematically illustrated in FIG. 15 for the upgraded 32-wavelength ring node, the node comprises CW 1501 and CCW 1501' MUX/DEMUX units, CW 1504 and CCW 1504' switch units, and CW 1506 and CCW 1506' receive/transmit units. Assuming that all receivers and transmitters can only operate at fixed wavelengths, in order to upgrade from 16 wavelengths to 32 wavelengths, additional receiver modules 1508, 1508' and transmitter modules 1509, 1509' have to be added. Similarly, two MUX/DEMUX modules 1502, 1503 must also be added. All MUX/DEMUX modules are operated in the unidirectional mode, i.e. functioning only as a MUX (1103, 1503) or a DEMUX (1102, 1502). Both CW 1504 and CCW 1504' switch units are identical to the switch unit 1104 of FIG. 11. The connections from the switch units 1504, 1504' to the receive/transmit units 1506, 1506' are achieved by using 4-fiber ribbon cables 1112 with straight fibers as in FIG. 11; the connections to the MUX/DEMUX units 1501, 1501' are done by using ribbon cables 809 with crossed center two fibers as in FIG. 8 since all MUX/DEMUX modules are now operated unidirectionally. The input/ouput (904/905) fibers for the CW traffic are provided by the modules 1102/1103, respectively. Similarly, the input/ouput (1504/1505) fibers for the CCW traffic are provided by the modules 1502/1503, respectively. The system in FIG. 15 represents a network node for two independent rings (CW and CCW) if each module in the switch units 1504, 1504' simply comprises two independent 2×2 switches, as shown in FIG. 15. Interaction between the CW and CCW rings, i.e. cross-pass, cross-add, and cross-drop, however, can be achieved by modifying each switch module into 4×4 configuration, as explained above.

Now that the invention has been described by way of a preferred embodiment, with alternatives, various modifications and improvements will occur to those of skill in the art. Thus, it is understood that the detailed description is provided as an example and not a limitation. The proper scope of the invention is defined by the appended claims.

We claim:

1. A modularly upgradable multi-channel optical node, comprising:
   a receive/transmit unit including at least a first electrical-to-optical transmitter and at least a first optical-to-electrical receiver;
   a MUX/DEMUX unit including at least one optical multiplexer and at least one optical demultiplexer; and
   an interconnection unit upgradably coupled to and interposed between (1) said first transmitter and said multiplexer and (2) said first receiver and said demultiplexer; said optical node upgradable in one of a number of channels by coupling a second electrical-to-optical transmitter to said multiplexer and a second optical-to-electrical receiver to said demultiplexer via said interconnection unit.

2. The optical node of claim 1, and further comprising: a switch unit coupled to and interposed between said interconnection unit and said MUX/DEMUX unit, said switch unit including a plurality of optical space switches.

3. The optical node of claim 2, wherein said switch unit is interposed wavelength by wavelength without disrupting other wavelengths.

4. The optical node of claim 1, wherein said interconnection unit comprises a first fiber ribbon cable such that a change in direction of transmission of an optical signal between said receive/transmit unit and said MUX/DEMUX unit is effected by replacing said first fiber ribbon cable with a second fiber ribbon cable, said second fiber ribbon cable having fibers interchanged relative to fibers of said first fiber ribbon cable.

5. The optical node of claim 1, wherein said receive/transmit unit includes slots for transmitters and receivers, said slots for transmitters being wavelength specific but usable for more than one wavelength and wherein the direction of transmission of an optical signal between said receive/transmit unit and said MUX/DEMUX unit is changeable.

6. The optical node of claim 1, wherein said interconnection unit enables optical node upgrades from an end node of N bidirectional optical channels over 2 fibers to an end node of 2N bidirectional optical channels over 2 fibers with no modifications in optical routing internal to said receive/transmit unit, said interconnect unit, and said MUX/DEMUX unit.

7. The optical node of claim 1, wherein said multiplexer and said demultiplexer comprise a bidirectional arrayed-waveguide grating.

8. The optical node of claim 7 further comprising a plurality of receive channels and transmit channels, wherein said interconnection unit comprises an interconnection fiber for each receive channel and each transmit channel, said interconnection fibers coupling said first transmitter to said multiplexer and said first receiver to said demultiplexer, said optical node upgradable without internally rewiring any of said interconnection unit, said receiver/transmitter unit and said MUX/DEMUX unit.

9. The optical node of claim 3 wherein said switch unit comprises modules, each of said modules coupling a respective wavelength between said interconnect unit and said MUX/DEMUX unit.

10. The optical node of claim 9 wherein any one of said modules affects only a coupling of the respective wavelength of said one module.

11. The optical node of claim 1, wherein said interconnection unit enables upgrades to said optical node from an end node of N bi-directional optical channels over 2 fibers to an N channel bidirectional add/drop ring network node over 2 fibers with the addition of a switch unit coupled to and interposed between said interconnection unit and said MUX/DEMUX unit and with no modifications in optical routing internal to said interconnect unit, said receive/transmit unit and said MUX/DEMUX unit.

12. In a multi-channel optical node including a receive/transmit unit having a first electrical-to-optical transmitter and a first optical-to-electrical receiver, a MUX/DEMUX unit having at least one optical multiplexer and at least one optical demultiplexer, and an interconnection unit coupled to and interposed between (1) the transmitter and the multiplexer (2) and the receiver and the demultiplexer; a method for modularly upgrading the node, the method comprising:
   increasing a number of multiplexer input channels by coupling a second electrical-to-optical transmitter to the multiplexer via the interconnection unit; and
   increasing a number of demultiplexer output channels by coupling a second optical-to-electrical receiver to the demultiplexer via the interconnection unit;
said optical node being upgradable in one of a number of channels without internally rewiring any of the receive/transmit unit, the MUX/DEMUX unit and the interconnection unit.

13. The method of claim 12 for modularly upgrading the number of channels in an end node wherein the multiplexer and the demultiplexer comprise a bidirectional multiplexer/demultiplexer, the method further comprising:
   changing the multiplexer and the demultiplexer from bi-directional to unidirectional;
   coupling the first transmitter and the second transmitter to a unidirectional multiplexer via the interconnection unit; and
   coupling the first and the second receiver to a unidirectional demultiplexer via the interconnection unit.

14. The method of claim 12, and further comprising interposing and coupling a switch unit between the interconnection unit and the MUX/DEMUX unit, wherein the switch unit includes a plurality of optical space switches which route optical signals between the interconnection unit and the MUX/DEMUX unit.

15. The method of claim 12, further comprising changing the direction of transmission of an optical signal between the receive/transmit unit and the MUX/DEMUX unit and carried on a line of the interconnection unit by interchanging a connection from the receive/transmit unit to the interconnection unit.

16. The method of claim 12, wherein the interconnection unit is a first fiber ribbon cable, further comprising of changing the direction of transmission of an optical signal between the receive/transmit unit and the MUX/DEMUX unit and carried on a line of the first fiber ribbon cable by replacing the first fiber ribbon cable with a second fiber ribbon cable having one or more pairs of fibers that are interchanged therein relative to the first fiber ribbon cable.

17. A modularly upgradable multi-channel optical node, comprising:

a receive/transmit unit, including a first electrical-to-optical transmitter and a first optical-to-electrical receiver;

a MUX/DEMUX unit having at least one optical multiplexer and at least one optical demultiplexer;

an interconnection unit coupled to and interposed between (1) said transmitter and said multiplexer and (2) said receiver and said demultiplexer;

means for upgrading said optical node in one of a number of channels without internally rewiring any of said receive/transmit unit, said MUX/DEMUX unit. and said interconnection unit.

18. The optical node of claim 17 for modularly upgrading the number of channels in an end node, wherein said multiplexer and said demultiplexer comprise a bidirectional multiplexer/demultiplexer, further comprising:

a second electrical-to-optical transmitter for upgrading a number of transmit channels;

a second optical-to-electrical transmitter for upgrading a number of receive channels;

means for changing said multiplexer and said demultiplexer from bidirectional to unidirectional;

means for coupling said first transmitter and said second transmitter to a unidirectional multiplexer via said interconnection unit; and means for coupling said first receiver and said second receiver to a unidirectional demultiplexer via said interconnection unit.

19. The optical node of claim 17, further comprising switch unit means interposed and coupled between the interconnection unit and the MUX/DEMUX unit, for enabling reconfigurable routing.

20. The optical node of claim 17, wherein the interconnection unit is a fiber ribbon cable, further comprising fiber ribbon cable means for changing the direction of transmission of an optical signal between said receive/transmit unit and said MUX/DEMUX unit and carried on a line of the fiber.

* * * * *